United States Patent
LeBert

(10) Patent No.: US 8,453,214 B1
(45) Date of Patent: *May 28, 2013

(54) METHODS OF LOCKING A WEBSITE

(75) Inventor: Don LeBert, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 306 days.

This patent is subject to a terminal disclaimer.

(21) Appl. No.: 12/911,056

(22) Filed: Oct. 25, 2010

(51) Int. Cl.
  *G06F 7/04* (2006.01)
(52) U.S. Cl.
  USPC .............................................. 726/4
(58) Field of Classification Search
  None
  See application file for complete search history.

(56) References Cited

U.S. PATENT DOCUMENTS

| | | |
|---|---|---|
| 6,654,804 B1 | 11/2003 | Fleming, III |
| 6,789,103 B1 | 9/2004 | Kim et al. |
| 6,842,769 B1 | 1/2005 | Kim et al. |
| 6,868,444 B1 | 3/2005 | Kim et al. |
| 2004/0133440 A1* | 7/2004 | Carolan et al. ............ 705/1 |
| 2008/0307339 A1* | 12/2008 | Boro et al. ............ 715/764 |
| 2010/0042927 A1 | 2/2010 | Kim |

OTHER PUBLICATIONS

Nov. 2, 2012 office action in related U.S. Appl. No. 12/911,049.
Nov. 6, 2012 office action in related U.S. Appl. No. 12/911,067.
Feb. 1, 2013 response to Nov. 2, 2012 office action in related U.S. Appl. No. 12/911,049.
Feb. 1, 2013 response to Nov. 6, 2012 office action in related U.S. Appl. No. 12/911,067.
Mar. 27, 2013 office action in related U.S. Appl. No. 12/911,067.
Apr. 4, 2013 response to Mar. 27, 2013 office action in related U.S. Appl. No. 12/911,067.
Apr. 1, 2013 office action in related U.S. Appl. No. 12/911,049.
Apr. 4, 2013 response to Apr. 1, 2013 office action in related U.S. Appl. No. 12/911,049.

* cited by examiner

*Primary Examiner* — Brandon Hoffman
(74) *Attorney, Agent, or Firm* — Karl A. Fazio

(57) ABSTRACT

Methods of the present inventions allow for locking a website. An exemplary method may comprise the steps of hosting a website on at least one server communicatively coupled to a network, receiving a request to lock the website, and, responsive to the request, changing access permissions to "read-only" for a directory, folder, file, database, or database table rendering the website functional.

26 Claims, 11 Drawing Sheets

METHODS OF LOCKING A WEBSITE

CROSS REFERENCE TO RELATED PATENT APPLICATIONS

This patent application is related to U.S. patent application Ser. No. 12/911,049 entitled: "TOOLS FOR LOCKING A WEBSITE" concurrently filed herewith and also assigned to Go Daddy Operating Company, LLC.

This patent application is related to U.S. patent application Ser. No. 12/911,067 entitled: "SUGGESTING ACCESS PERMISSION CHANGES TO LOCK A WEBSITE" concurrently filed herewith and also assigned to Go Daddy Operating Company, LLC.

FIELD OF THE INVENTION

The present inventions generally relate to website hosting and, more particularly, tools and methods for locking a website.

SUMMARY OF THE INVENTION

An example embodiment of a system for locking a website may comprise a server communicatively coupled to a network, wherein the server hosts a website and stores the website's files in one or more folders or directories. It also may comprise a website management server (also communicatively coupled to the network) hosting a control panel website configured to receive a request to lock the website and, responsive to the request, change access permissions for the website's files to "read-only."

An example embodiment of a method of locking a website may comprise the steps of hosting a website, receiving a request to lock the website, and, responsive to the request, changing access permissions to "read-only" for a directory, folder, file, database, or database table rendering the website functional.

An example embodiment of a method for suggesting access permission changes to lock a website may comprise the steps of scanning a website's root file directory, determining whether folders, files, databases, or database tables in the root directory are static, and transmitting a recommendation to change access permissions to "read-only" for each folder, file, database, or database table determined to be static.

The above features and advantages of the present inventions will be better understood from the following detailed description taken in conjunction with the accompanying drawings.

DETAILED DESCRIPTION

Figure 1:
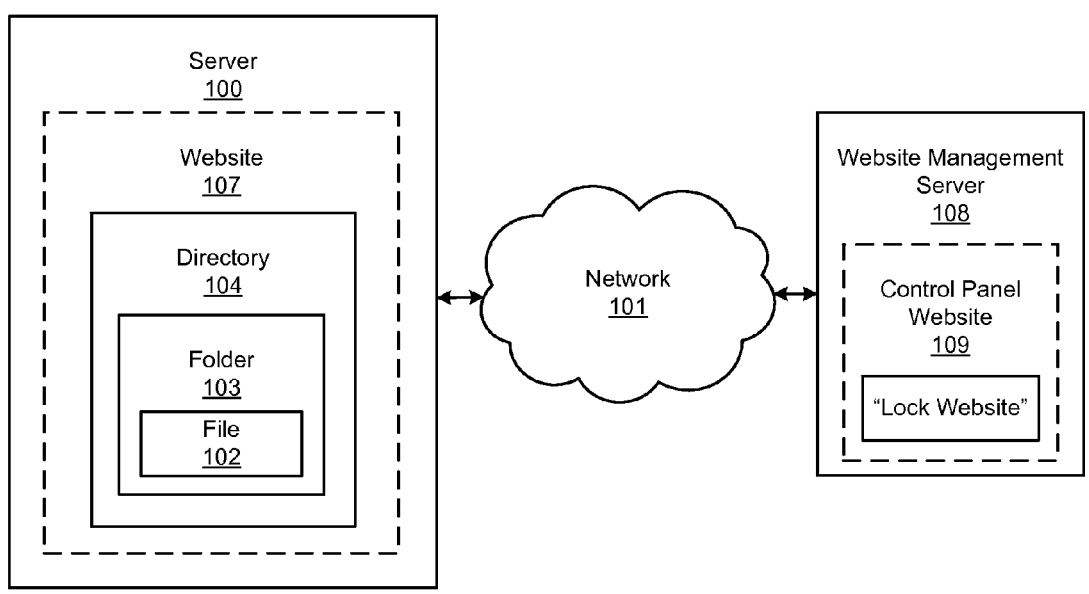
FIG. 1 illustrates a possible embodiment of a system for locking a website.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Menus and links may be used to move between different webpages within the website or to move to a different website as is known in the art. The interconnectivity of webpages enabled by the Internet can make it difficult for Internet users to tell where one website ends and another begins. Websites may be created using HyperText Markup Language (HTML) to generate a standard set of tags that define how the webpages for the website are to be displayed. Such websites may comprise a collection of HTML and subordinate documents (i.e., files) stored on the Web that are typically accessible from the same Uniform Resource Locator (URL) and reside on the same server, although such files may be distributed in numerous servers.

Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC: BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain. An example of a URL with a HTTP request and domain is: http://www.companyname.com. In this example, the "http" identifies the URL as a HTTP request and the "companyname.com" is the domain.

Domains are much easier to remember and use than their corresponding IP addresses. The Internet Corporation for Assigned Names and Numbers (ICANN) approves some Generic Top-Level Domains (gTLD) and delegates the administrative responsibility to a particular organization (a "registry") for maintaining an authoritative source for the registered domains within a TLD and their corresponding IP addresses. Such a registry may comprise any registry or other entity under contract (or other agreement) with ICANN to administer one or more TLDs, a registry operator that may comprise any entity sub-contracted with the registry to administer the TLD on behalf of the registry and make the TLD available to registrars for registration, and/or any agent operating on behalf of a registry to carry out the registries' contractual obligations with ICANN. For certain TLDs (e.g., .biz, .info, .name, and .org) the registry is also the authoritative source for contact information related to the domain and is referred to as a "thick" registry. For other TLDs (e.g., .com and .net) only the domain, registrar identification, and name server information is stored within the registry, and a registrar is the authoritative source for the contact information related to the domain. Such registries are referred to as "thin" registries. Most gTLDs are organized through a central domain Shared Registration System (SRS) based on their TLD.

The process for registering a domain with .com, .net, .org, or other TLDs allows an Internet user to use an ICANN-accredited registrar to register their domain. For example, if an Internet user, John Doe, wishes to register the domain "mycompany.com," John Doe may initially determine whether the desired domain is available by contacting a domain registrar. The Internet user may make this contact using the registrar's website and typing the desired domain into a field on the registrar's webpage created for this purpose.

Upon receiving the request from the Internet user, the registrar may ascertain whether "mycompany.com" has already been registered by checking the SRS database associated with the TLD of the domain. The results of the search then may be displayed on the registrar's website to thereby notify the Internet user of the availability of the domain. If the domain is available, the Internet user may proceed with the registration process. If the domain is not available for registration, the Internet user may keep selecting alternative domains until an available domain is found. When a domain is registered, the registrar may pay a registration fee to the registry responsible for administering the TLD used by the registered domain. Continuing with the previous paragraph's example, upon registration of the domain "mycompany.com," although the registrar may have collected a fee from the domain registrant, it also may have paid the registry the appropriate registration fee for the allocated .com TLD.

Websites, unless extremely large and complex or have unusual traffic demands, typically reside on a single server and are prepared and maintained by a single individual or entity. Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Hosting providers often sell website hosting services based upon the content provider's anticipated memory and bandwidth needs. For example, a content provider may pay a lower monthly fee for 100 gigabytes (GB) of server disk space and 1000 GB of bandwidth than another content provider whose website may require 500 GB and 5000 GB of server disk space and bandwidth, respectively. Content providers must carefully evaluate their website's anticipated storage and bandwidth needs and select their hosting plan accordingly.

Content providers also need to design their websites with security in mind. If not properly designed, the files (and/or databases) that provide the website's functionality may be hacked, and perhaps altered or even overtaken, by unscrupulous or malicious Internet users. For example, some interactive websites may be configured (perhaps by having File Transfer Protocol (FTP) or Web search functionality) to allow users to upload data or files (e.g., photographs, videos, documents, search strings, etc.) to the website, its directories, or databases, thereby exposing the website backend to Internet users.

Such security vulnerabilities may be exploited by many known hacking techniques including SQL injection, Remote File Inclusion (RFI), Local File Inclusion (LFI), or Cross-Site Scripting (XSS). These (and other similar hacking techniques) may cause the uploading of unwanted and potentially malicious files and/or result in the corruption of the files or databases that provide the website's functionality, perhaps rendering the website inoperable. Websites also may be corrupted (inadvertently or intentionally) by a content provider's family, friends, or co-workers who have access to the website's files.

Applicant has determined that presently-existing website hosting systems and methods do not provide optimal means for protecting against such website corruption. Specifically, there is a need for the systems, methods, and other tools for locking a website (including the files, directories, folders, databases, and/or database tables that render the website functional) as described herein.

Tools for Locking a Website

FIG. 1 illustrates an embodiment of a system for locking a website that may comprise at least one server computer 100 communicatively coupled to a network 101 hosting a website 107, perhaps by storing at least one file 102 in at least one folder 103 or at least one directory 104 of the at least one server computer 100. The illustrated embodiment also may comprise at least one website management server 108 (that also may be communicatively coupled to the network 101) hosting a control panel website 109 configured to receive a request to lock the website 107 and—responsive to receiving the request to lock—change an access permission to a read-only status for the at least one directory 104, at least one folder 103, or at least one file 102.

The example embodiments illustrated herein place no limitation on network 101 configuration or connectivity. Thus, as non-limiting examples, the network 101 could comprise the Internet, the public switched telephone network, the global Telex network, computer networks (e.g., an intranet, an extranet, a local-area network, or a wide-area network), wired networks, wireless networks, or any combination thereof.

Servers 100 (and/or any other server described herein) may be communicatively coupled to the network 101 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof. As non-limiting examples, the servers 100 could be application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, or any combination thereof).

The website 107 may comprise any collection of data and/or files 102 accessible to a client or server 100 communicatively coupled to the network 101. As a non-limiting example, the website 107 may comprise a single webpage or multiple interconnected and related webpages resolving from a domain name, each of which may provide access to static, dynamic, multimedia, or any other content, perhaps by accessing files 102 (e.g., text, audio, video, graphics, executable, HTML, eXtensible Markup Language (XML), Active Server Pages (ASP), Hypertext Preprocessor (PHP), Flash files, server-side scripting, etc.) that enable the website 107 to display when rendered by a browser on a client.

Such files 102 may be stored in any data storage medium capable of storing data or instructions for access and/or execution by a computing device, such as a server 100 or client computer. Such data storage may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage, perhaps in a network storage device communicatively coupled to the network 101, such as a hard drive or other memory on a server 100.

Stored files 102 may be organized in a server's 100 filesystem, which may organize the files 102 for the storage, organization, manipulation, and retrieval by the server's 100 operating system. As illustrated in FIG. 1, the server's 100 filesystem may comprise at least one directory 104, which in turn may comprise at least one folder 103 in which files 102 may be stored. In most operating systems, files 102 may be stored in a root directory, sub-directories, folders 103, or sub-folders within the filesystem.

Most filesystems have systems and methods of administering access permissions or access rights to specific users and/or groups of users. Such systems control the ability of users to view, edit, add to, delete, or otherwise make changes to files 102 in the directories 104 and/or folders 103 of the filesystem. There are numerous different access permission types that may apply to directories 104, folders 103, or files 102. For example, the "read" permission may grant a user the ability to read a file 102. The "write" permission may grant the ability to modify a file 102. The "modify" permission may grant the ability to read, write to, and delete files 102. The "read and execute" permission may grant the ability to execute a file 102. The "full control" permission may enable a user to read, write to, change, and delete files 102 and folders 103. Depending on the server's 100 operating system and filesystem, other access permission conventions may be used (e.g., write, read, execute, update, delete, or drop), but they all generally control who may read, run, modify, or delete files 102 stored on the server 100.

As explained above, if not properly designed, the website's 107 files 102 may be accessed, and perhaps modified or deleted, by unscrupulous or malicious Internet users. For example, an interactive website 107 may be configured, perhaps by having FTP functionality, to allow users to upload data or files (e.g., photographs, videos, documents, search strings, etc.) to the website 107 (e.g., its directory 104 or folders 103). If any of the website's 107 directories 104, folders 103, or files 102 have permissions set to allow access (e.g., a write, modify, or full control permission), it is possible that users may hack the website 107 by modifying, deleting, or uploading files 102 to the directory 104, perhaps using the hacking techniques described above.

To mitigate this risk, the illustrated embodiment also may comprise a specially-configured control panel website 109 hosted on at least one website management server 108. The control panel website 109 may comprise a web-based interface (perhaps provided by the website's 107 hosting provider) that provides tools allowing a website owner, operator, or content provider to manage the website 107 and/or other hosted services such as databases or email accounts. Commonly-available control panel functionality may include providing access to server 100 logs, details of available and used storage and bandwidth, website 107 visitor statistics, email account configuration, online file storage configuration, FTP management, etc.

The control panel website 109 illustrated in FIG. 1 additionally may be configured to receive a request to lock the website 107 and (perhaps responsive to receiving the request to lock) change an access permission to a read-only status for the server's 100 directory(ies) 104, folder(s) 103, or file(s) 102. As a non-limiting example, the control panel website 109 may be configured to receive a request to lock the website 107 by displaying an interactive webpage enabling a website 107 owner or operator to make a "lock website" request. For example, software and/or scripts running on the website management server 108 may cause a webpage to render in a browser on a client, wherein the webpage may have a "lock website" button, or a functionally-similar interface element (e.g., drop-down box, click box, etc.). The control panel website 109 may be access-protected (e.g., password-protected, single-sign-on protected, etc.) to ensure that only authorized personnel may lock the website 107.

The website management server 108 then may receive a HTTP request, perhaps generated by the control panel website 109 indicating that a lock request has been made. Alternatively, the lock request may be received as any communication transmitting a request to lock a website 107, perhaps via an electronic communication received at the website management server 108 including, but not limited to, electronic requests such as a FTP transmission, an email message, a Short Message Service (SMS) message (i.e., text message), Multimedia Messaging Service (MMS) message, or other instant message.

Responsive to receiving the lock website request, the control panel website 109, perhaps via software and/or scripts running on the website management server 108, may automatically change the access permission for directory(ies) 104, folder(s) 103, or file(s) 102 on the server 100 hosting the website 107 to "read-only," thus disabling other Internet users from deleting, modifying, or uploading files 102 in or to the directory 104 or its folders 103.

The website management server 108 hosting the control panel website 109 may change such access permissions, as a non-limiting example, by transmitting a HTTP request to the server 100. Perhaps after successfully authenticating the requesting entity's (e.g., the website 107 owner or operator's) credentials, the server 100 may set access permissions to all or some of the website's 107 files 102, folders 103, and/or directories 104 to a read-only status. Files 102 stored on a server 100 running a Linux-based operating system may be locked (e.g., rendered immutable) via the "chattr" command (a Linux command that renders changes to certain attributes on a file 102 residing in the server's 100 filesystem). Among other things, the chattr command may make files 102 immutable so that, for example, password files and/or certain system files cannot be erased.

Figure 2:
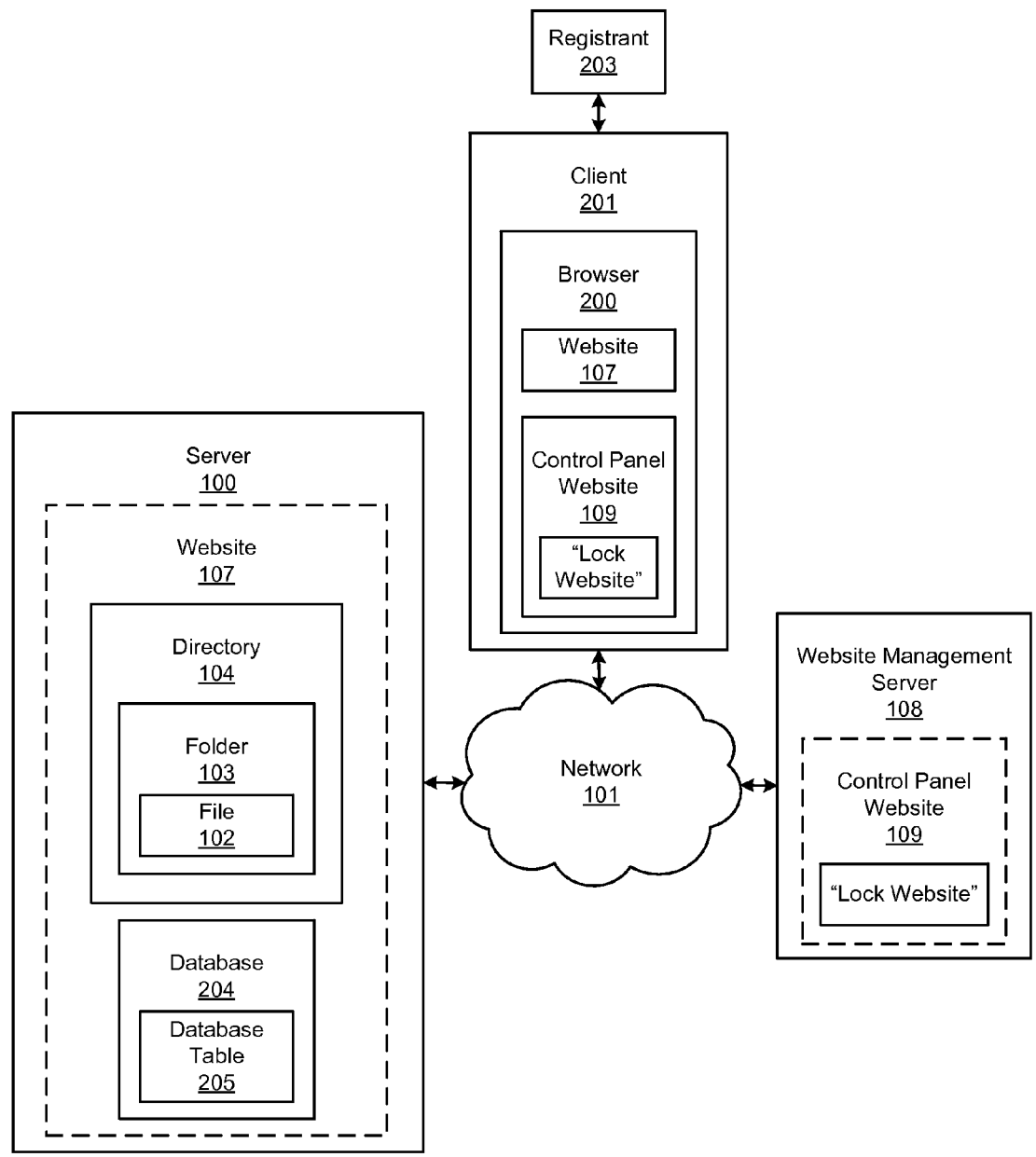
FIG. 2 illustrates a possible embodiment of a system for locking a website.

As illustrated in FIG. 2, a possible embodiment also may comprise, in addition to the features illustrated in FIG. 1, a database 204 running on the server 100. The database 204 may store data, perhaps via database tables 205, database relations, or structured files, which may provide additional functionality to the website 107, perhaps by being accessed by scripting (e.g., PHP or ASP) or other executable files 102 running on the server 100. Database tables 205 may comprise any set of organized data elements (i.e., values), perhaps organized using a model of vertical columns and horizontal rows. As non-limiting examples, a database 204 storing or accessing such data may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

In this illustrated embodiment, the control panel website 109 may be configured to (perhaps responsive to receiving a request to lock the website 107), change an access permission to a read-only status for a database 204 and/or database table 205. As with the directories 104, folders 103, or files 102 described above, databases 204 and database tables 205 may have access permission settings that may be changed, perhaps by receiving a "write-lock" command (locking the database 204 to prevent any other access to it) or a "read-lock" command (locking the database 204 to prevent updates, but allowing concurrent queries).

Any method or command for locking a database 204 or database table 205 may be implemented by the control panel website 109 including, but not limited to transmitting a command for the following lock types: "read-only" (allowing any other read or write transactions except a blocking transaction on the table); "read-key" (does not allow other transactions to change primary key values in the table); "read-data" (does not allow any write transactions to the table); "write-data" (does not modify existing primary key values in the database 204); "write-key" (modifying existing primary key values in the database 204) and/or; "write-blocking" (does not allow any other read or write transactions on the table).

Such locking commands may be transmitted by the control panel website 109 via any electronic communication means known in the art or developed in the future including, but not limited to, transmitting an HTTP request to a server 100 running the database 204. As illustrated in FIG. 2, the control panel website 109 may be accessed by a user (perhaps the registrant 203 of the domain name from which the website 107 resolves) via a browser 200 on a client 201. Clients 201 that may be used to connect to the network 101 include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

In addition to the automated website locking systems described above, the control panel website 109 also may be configured to enable website 107 owners or operators, perhaps the website's 107 domain name registrant 203, to manually configure directory 104, folder 103, file 102, database 204, or database table 205 access permissions. As a non-limiting example, the control panel website 109 may provide (e.g., render in a browser 200) a registrant 203 with list of all of the website's 107 directories 104, folders 103, files 102, databases 204, or database tables 205 with an option (e.g., check box or drop down menu) to select the access permissions for each.

The control panel website 109 also may be configured (perhaps via a check box or drop down menu rendered in a browser 200) to enable the registrant 203 to enable and/or disable file transfer to the website 107 by all file upload methods or protocols including, but not limited to via, FTP, file transfer protocol-secure, secure copy protocol, or secure shell network protocol. Once such settings are received by the control panel website 109, it may set all such permissions and settings according to the registrant's 203 selections, perhaps by transmitting a request with such settings via HTTP protocol to the server 100.

Figure 3:
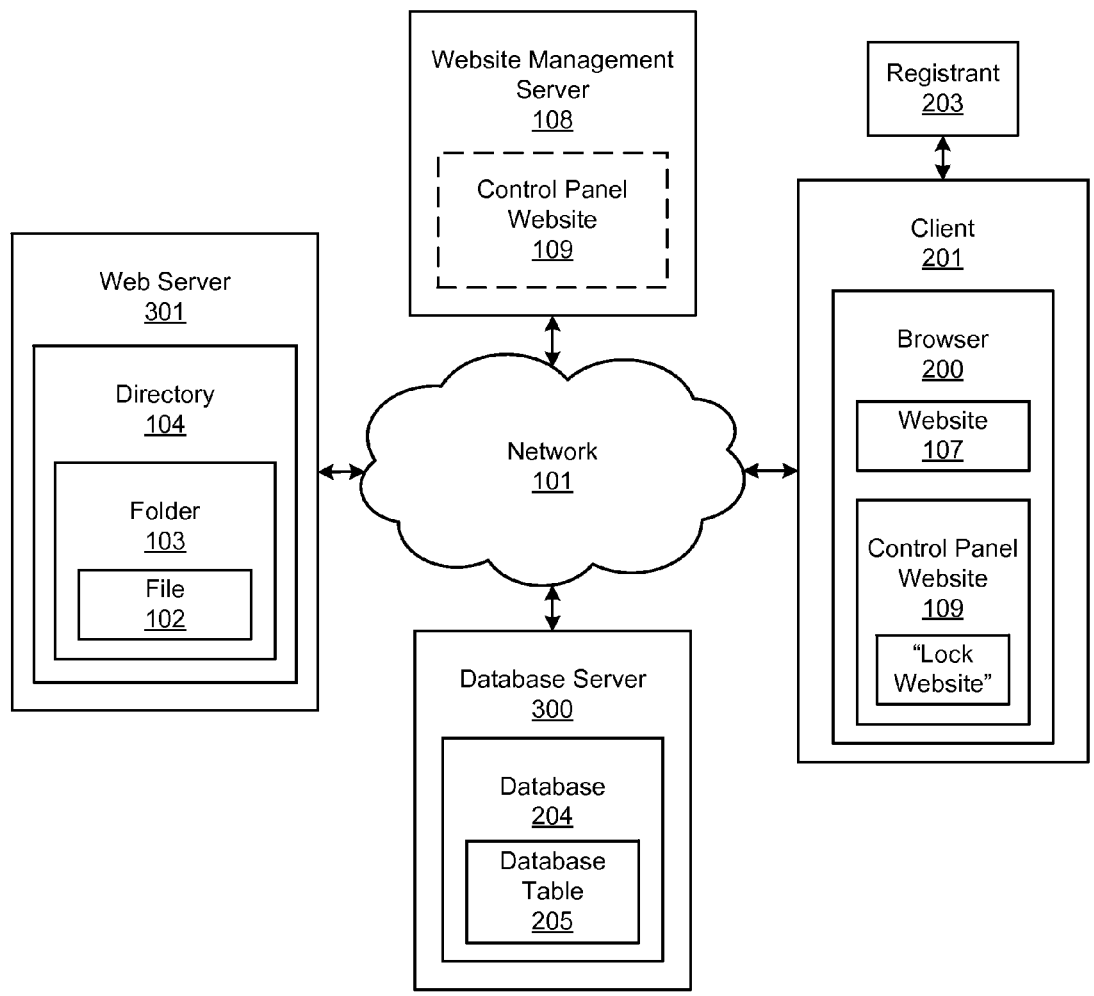
FIG. 3 illustrates a possible embodiment of a system for locking a website.

FIG. 3 illustrates a highly-distributed system embodiment, wherein the database 204 runs on an independent database server 300 and the directory 104, folders 103, and files 102 are stored on an independent web server 301, each of which are communicatively coupled to the network 101. The web server 301 may comprise any server 100 configured to deliver content (e.g., web pages), perhaps using HTTP protocol via the Internet, to clients 201 requesting the same. The database server 300 may comprise any server 100 configured to provide database services to requesting clients 201 (or other software applications or computers), perhaps according to the client-server model.

Figure 4:
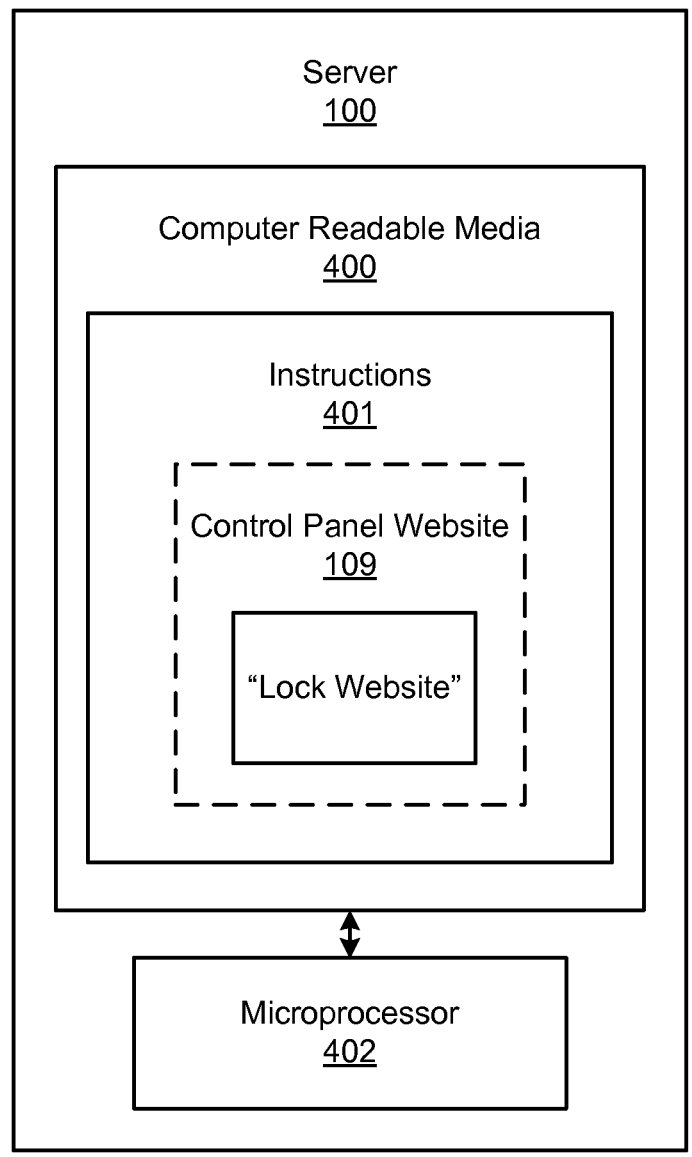
FIG. 4 illustrates a possible embodiment of a system for locking a website.

FIG. 4 illustrates a computer-readable storage media 400 storing instructions 401 that, when executed by at least one computing device (e.g., a microprocessor 402 on a server 100 or client 201), cause the computing device to host a website 107 on at least one server 100 communicatively coupled to a network 101, receive, by one or more of the at least one server 100, a request to lock the website 107, and—responsive to receiving the request to lock—change at least one access permission to a read-only status for at least one directory 104, folder 103, file 102, database 204, or database table 205 rendering the website 107 functional. Each of these steps is discussed in further detail below with respect to FIG. 5.

The computer-readable media 400 may comprise any data storage medium capable of storing instructions for execution by a computing device. It may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage. The instructions 401 may, as non-limiting examples, comprise software and/or scripts stored in the computer-readable media 400 that may be stored locally in the website management server 108 or, alternatively, in a highly-distributed format in a plurality of computer-readable media 400 accessible via the network 101, perhaps via a grid or cloud-computing environment.

Methods of Locking a Website

Figure 5:
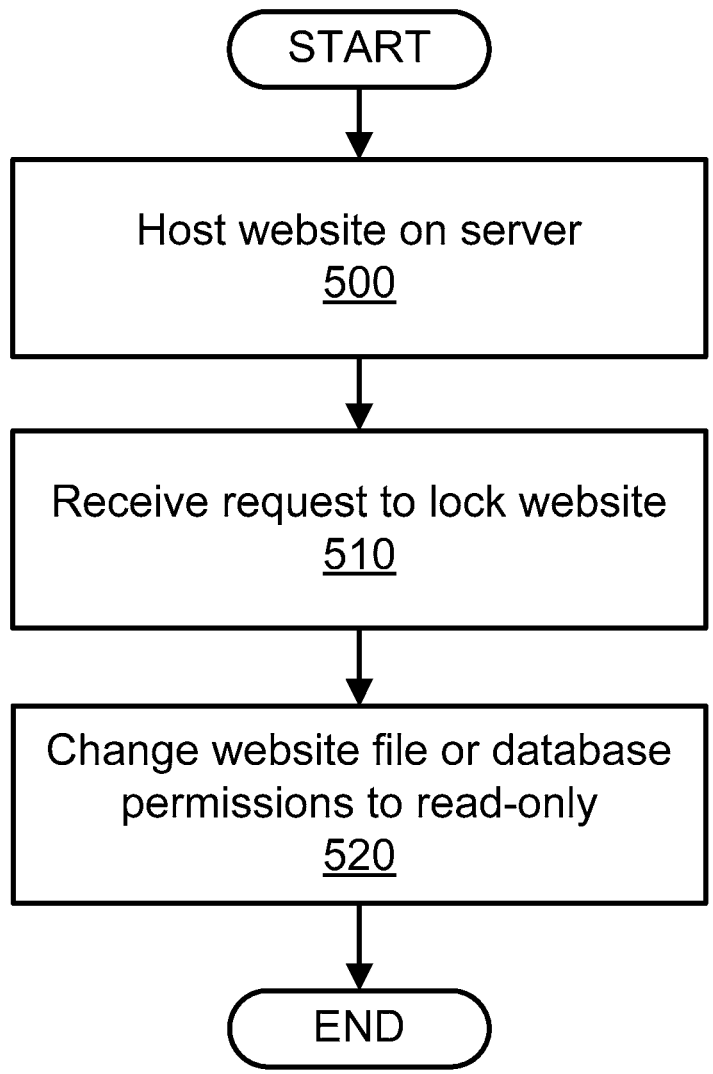
FIG. 5 is a flow diagram illustrating a possible embodiment of a method of locking a website.

FIG. 5 illustrates an embodiment of a method of locking a website that may comprise the steps of hosting a website 107 on at least one server 100 communicatively coupled to a network 101 (Step 500), receiving a request to lock the website 107 (Step 510), and—responsive to receiving the request to lock—changing at least one access permission to a read-only status for the directory 104, folders 103, files 102, databases 204, and/or database tables 205 that render the website 107 functional (Step 520).

As a non-limiting example, the steps all methods described in this patent application may be performed by any central processing unit (CPU) in any computing system, such as a microprocessor 402 running on one or more servers 100 and executing instructions 401 stored (perhaps as scripts and/or software) in computer-readable media 401 accessible to the CPU or microprocessor 401, such as a hard disk drive on a server 100, which may be communicatively coupled to a network 101 (e.g., the Internet). Such software and/or scripts may comprise server-side software and/or client-side software.

The website 107 may be hosted (Step 500) by any system or method known in the art or developed in the future for website hosting including, but not limited to, storing the website's 107 files 102, databases 204, and/or database tables 205 on a server 100 communicatively coupled to a network 101, perhaps for access by a client 201 running a browser 200 configured to render the website 107 on the client's 201 display. As non-limiting examples, the website 107 may be hosted on the website 107 owner or operator's computer or server or, alternatively, by a hosting provider as described in detail above.

A request to lock the website 107 may be received (Step 510) by any method of receiving a request known in the art or developed in the future including, but not limited to, receiving an electronic communication, a telephone communication, an in-person, communication, or a written communication. As a non-limiting example, a control panel website 109 hosted on a website management server 108 may be configured (e.g., programmed) to receive a request to lock a domain name registrant's 203 website 107 (Step 510), perhaps by displaying a virtual button entitled "lock website" that, when "clicked" by the registrant 203, transmits a request via HTTP protocol that is received by the website management server 108. In response, the website management server 108 then may transmit the request to lock to the server 100 hosting the website 107 via any of the above-described data or request transmission protocols.

Responsive to receiving the request to lock, the server 100 may change permissions to a read-only status for the directories 104, folders 103, files 102, databases 204, and/or database tables 205 that provide website 107 functionality (Step 520). Such permissions may be changed as described in detail above. Permissions may be changed in any manner necessary to reduce access (e.g., by user or by file). Accordingly, permissions may be changed to read-only or, alternatively, write, update, drop, or delete permissions may be revoked.

Figure 6:
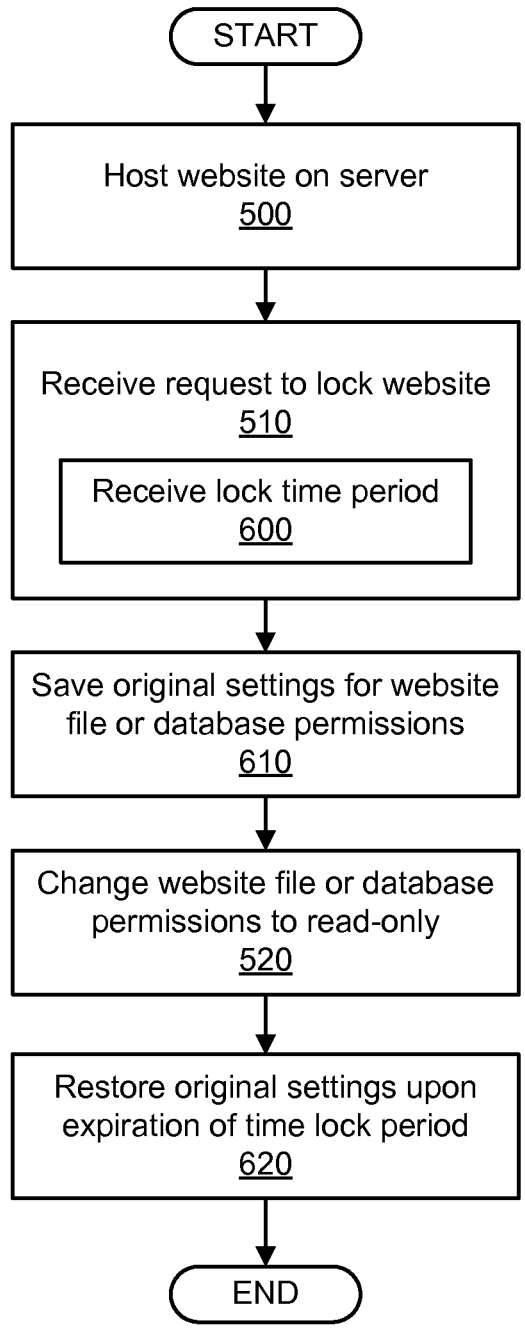
FIG. 6 is a flow diagram illustrating a possible embodiment of a method of locking a website.

FIG. 6 illustrates an embodiment wherein the website 107 lock request received by the control panel website 109 (Step 510) may include a period of time for which the website 107 owner or operator (e.g., registrant 203) desires to lock the website 107 (Step 600). As a non-limiting example, the registrant 203 may indicate (e.g., enter in a field on a webpage of the control panel website 109) that the website 107 is to remain locked for a period of two weeks (or any other time period). Alternatively, the registrant 203 may enter a lock start and end date (and/or time). And as described in the preceding paragraphs, the control panel website 109 may change permissions (Step 520), perhaps by automatically locking some or all of the website's 107 directories 104, folders 103, files 102, databases 204, or database tables 205. Alternatively, it may provide the registrant 203 with tools for individually setting permissions for each.

Prior to changing permissions (Step 520), however, the control panel website 109 (e.g., software and/or scripts running on the website management server 108 or the server 100) may save the original access permission settings (Step 610). As a non-limiting example, the original settings may be stored in a file, perhaps on the website 107 hosting server 100, the website management server 108, a client 201, or any other network storage device communicatively coupled to the network 101. Permissions may then be changed (Step 520) as described in detail above. However, upon expiration of the requested time period, the changed access permissions may be reset to the original settings (Step 620), perhaps by the control panel website 109 accessing the stored settings and transmitting them to the website's 107 hosting server 100, which may reset permissions accordingly.

Figure 7:
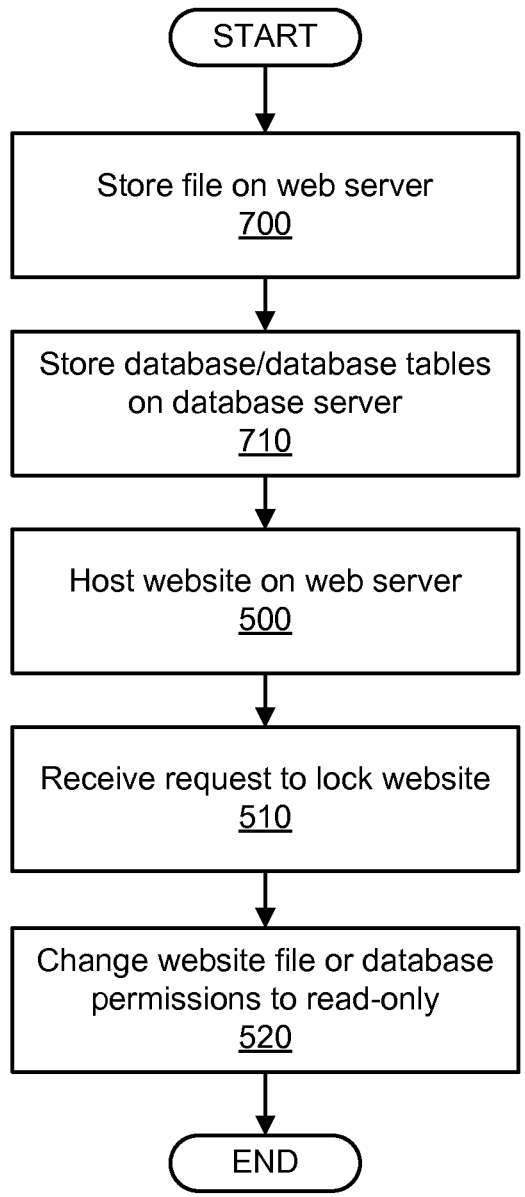
FIG. 7 is a flow diagram illustrating a possible embodiment of a method of locking a website.

FIG. 7 illustrates an alternate embodiment of a method of locking a website that may comprise the steps of storing at least one file 102 in at least one folder 103 or at least one directory 104 on at least one web server 301 communicatively coupled to a network 101 (Step 700), storing at least one database 204 or at least one database table 205 on at least one database server 300 communicatively coupled to the network 101 (Step 710), hosting a website 107 on at least one web server 301 communicatively coupled to the network 101, wherein the website 107 is configured to provide functionality by accessing the stored directory 104, folders 103, files 102, databases 204, and/or database tables 205 (Step 500), receiving (perhaps by at least one web server 301) a request to lock the website 107 (Step 510), and (perhaps responsive to receiving the request to lock) changing (perhaps by at least one web server 301), an access permission to a read-only status for the stored directory 104, folders 103, files 102, databases 204, and/or database tables 205 (Step 520). Steps 700 and 710 may be accomplished by any method of storing website files 102 and/or data known in the art or developed in the future. Steps 500 though 520 may be performed as described in detail above.

Figure 8:
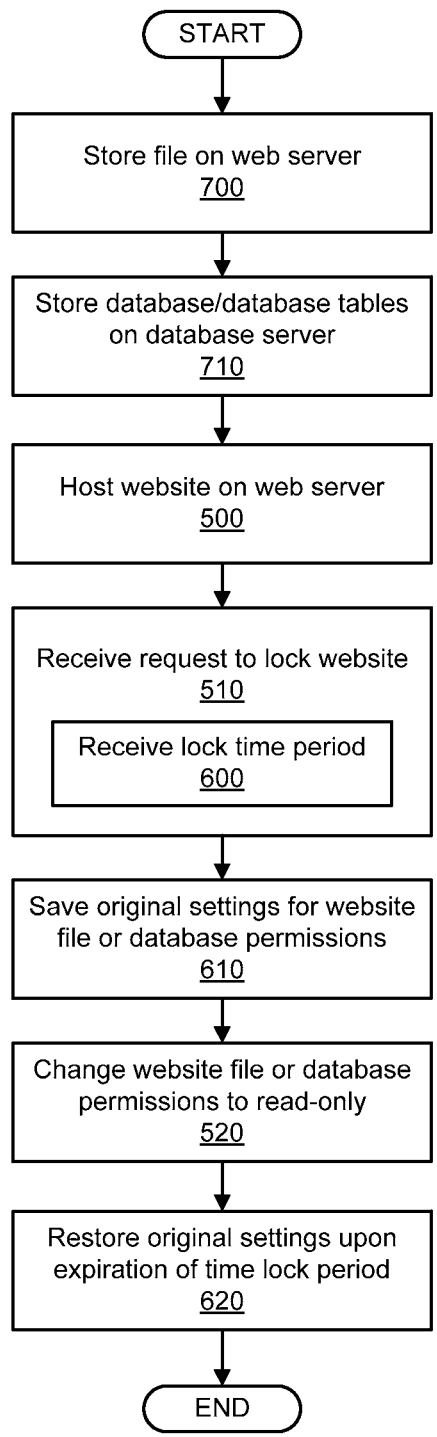
FIG. 8 is a flow diagram illustrating a possible embodiment of a method of locking a website.

The method embodiment illustrated in FIG. 8 builds upon that shown in FIG. 7. In this example embodiment, the website 107 lock request received in Step 510 may include a period of time for which the website 107 owner or operator (e.g., registrant 203) desires to lock the website 107 (Step 600). Prior to changing permissions (Step 520), however, the control panel website 109 (e.g., software and/or scripts running on the website management server 108 or the server 100) may save the original access permission settings (Step 610). Permissions may then be changed (Step 520) as described in detail above. However, upon expiration of the requested time period, the changed access permissions may be reset to the original settings (Step 620).

The above-described methods (or any step of such methods) also may be performed by an application programming interface (API) running on at least one server 100 communicatively coupled to a network 101. The API may comprise computer-readable code that, when executed by at least one server 100, causes the API to perform each method step. The API may comprise a software-to-software interface that specifies the protocol defining how independent computer programs interact or communicate with each other. As a non-limiting example, the API may allow the website's 107 hosting server 100 to receive commands to lock the website 107—perhaps over the network 101—through a series of function calls (requests for services). The API may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

Suggesting Access Permission Chances to Lock a Website

Figure 9:
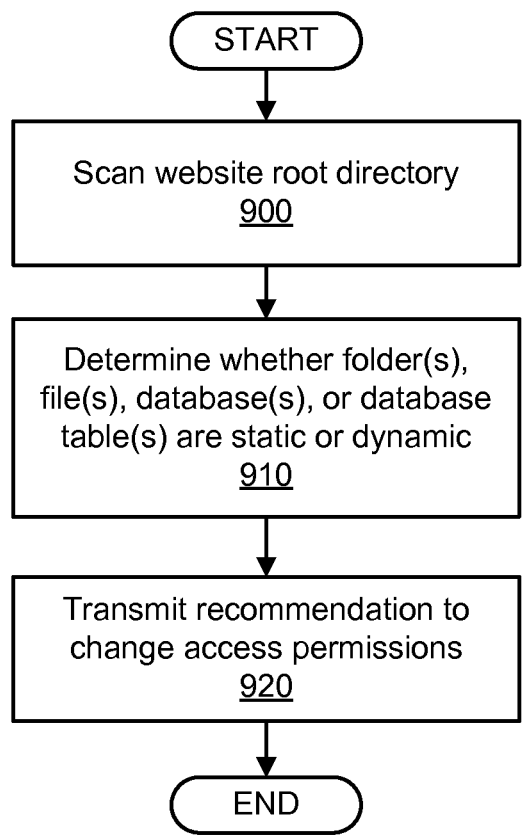
FIG. 9 is a flow diagram illustrating a possible embodiment of a method for suggesting access permission changes to lock a website.

FIG. 9 illustrates an embodiment of a method of suggesting access permission changes to lock a website. The illustrated embodiment may comprise the steps of scanning a root directory 104 of one or more servers 100 (or web servers 301) hosting a website 107 (Step 900) (and/or scanning the storage of one or more database servers 300 storing a database 204 or database table 205 providing website 107 functionality), determining whether at least one folder 103, file 102, database 204, or database table 205 in the root directory 104 (and/or other storage) is static (Step 910), and transmitting a recommendation that at least one access permission be changed to read-only for at least one directory 104, folder 103, file 102, database 204, or database table 205 determined to be static (Step 920).

An operating principle behind this illustrated embodiment is that the directories 104, folders 103, files 102, databases 204, or database tables 205 that provide the most functionality (or interactivity) for a website 107 (i.e., are dynamic) should retain access permission settings that continue to allow the website 107 to function properly. Thus, only directories 104, folders 103, files 102, databases 204, or database tables 205 that are determined to be static (Step 910) should be locked (i.e., changed to a read-only access permission).

Accordingly, a "wizard" (perhaps software and/or scripts running on a server 100, web server 301, database server 300, website management server 108, and/or client 201 and accessible via a control panel website 109) may be configured (e.g., programmed with instructions) to perform periodic scans of the website's 107 root directory 104 (or other networked storage) to determine which directories 104, folders 103, files 102, databases 204, or database tables 205 appear to "grow" and/or which folders 103 tend to gather more temporary files 102. Those that grow may be flagged as dynamic, while those that do not grow (or grow less than others) may be flagged as static.

Figure 10:
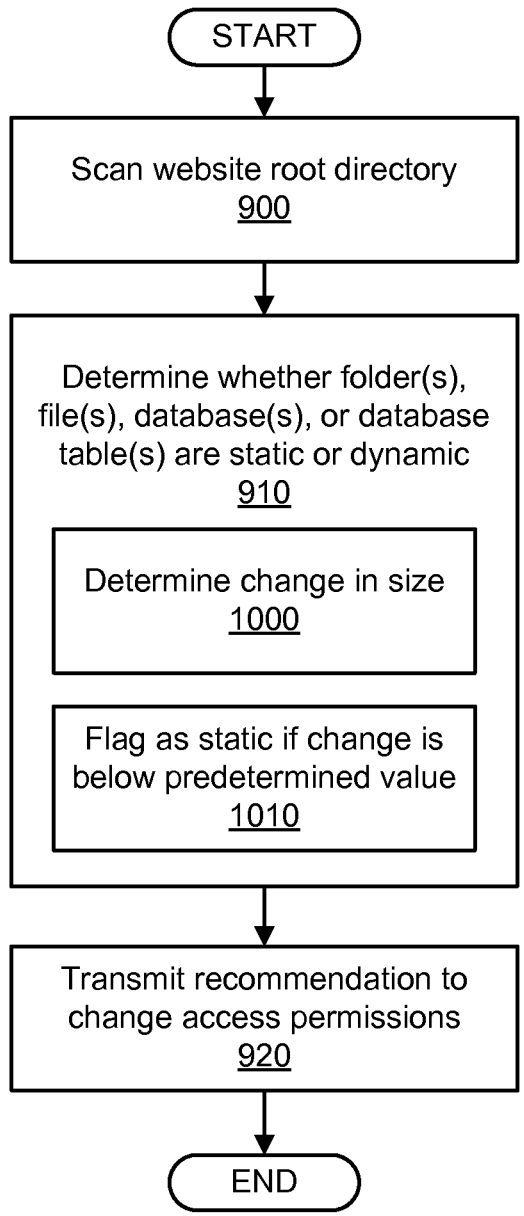
FIG. 10 is a flow diagram illustrating a possible embodiment of a method for suggesting access permission changes to lock a website.

For example, as illustrated in FIG. 10, such software may determine a change in size over a predetermined timeframe of such directories 104, folders 103, files 102, databases 204, and/or database tables 205 (Step 1000). As a non-limiting example, this step may be accomplished by determining a file's 102 size at two or more points in time and calculating the change in file 102 size over time. Each of those determined to have a change in size below a predetermined value (e.g., a percentage change in size, an absolute size, or any other size parameter) then may be flagged as static (Step 1010), perhaps in metadata associated with the file 102, or in a separate file or database.

Once static directories 104, folders 103, files 102, databases 204, or database tables 205 are identified as static (Step 910), software may transmit a suggestion, perhaps to the website 107 owner or operator, as to which of those to lock down based upon the least amount of change in size (Step 920). The suggestion may be transmitted via any means or method transmitting an electronic message known in the art or developed in the future including, but not limited to, an HTTP request/transmission, a FTP transmission, an email message, a SMS message (i.e., text message), a MMS message, or any other electronic message or communication. The website 107 owner or operator receiving the suggestion may then opt to change access permissions (perhaps via a control panel website 109) accordingly.

Figure 11:
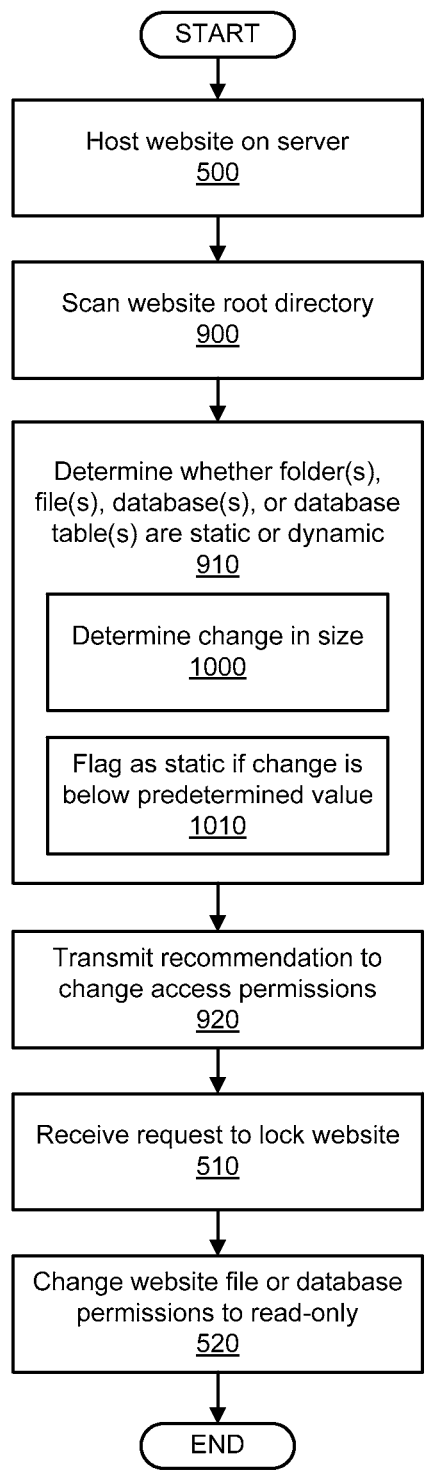
FIG. 11 is a flow diagram illustrating a possible embodiment of a method for suggesting access permission changes to lock a website.

FIG. 11 illustrates a more detailed embodiment of a method of suggesting access permission changes to lock a website. The illustrated embodiment may comprise the steps of hosting a website 107 on at least one server 100 communicatively coupled to a network 101 (Step 500), scanning the server's 100 root directory 104 (and/or scanning the storage of one or more database servers 300 storing a database 204 or database table 205 providing website 107 functionality), determining whether at least one folder 103, file 102, database 204, or database table 205 in the root directory 104 (and/or other storage) is static (Steps 910, 1000, and 1010), transmitting a recommendation that at least one access permission be changed to read-only for those determined to be static (Step 920), receiving a request to lock the website 107 (Step 510), and (perhaps responsive to receiving the request to lock) changing at least one access permission to a read-only status for the directory 104, folders 103, files 102, databases 204, and/or database tables 205 that render the website 107 functional (Step 520).

An Example Use of Systems, Methods, and Tools for Locking a Website

After registering a domain name with a domain name registrar, a registrant 203 may develop a website 107 and pay a hosting provider to host the website 107 (Step 500) on the hosting provider's hosting servers 100, which are communicatively coupled to the Internet. As a non-limiting example, the domain name registrar and hosting provider may be a single service provider, such as GODADDY.COM. The website 107 may comprise a plurality of files 102 stored in a folder 103 in a directory 104 in the server's 100 filesystem. The website 107 also may provide functionality by accessing a database 204 also running on the server 100.

A software wizard running on the hosting provider's server 100 may subsequently scan the files 102 and database 204 (Step 900) to determine which files 102 and database tables 205 are most often written to or read from to determine those that provide the highest level of functionality and/or interactivity to website 107 users. Files 102 determined to have a low level of interactivity may be flagged as static (Steps 910 and 1010) then may be included in an email sent (Step 920) to the registrant 203 suggesting that such static files should be locked down.

Perhaps responsive to receiving such an email, the registrant 203 may elect to lock down (i.e., change access permission status to read only) all of the website's 107 files 102, folders 103, directories 104, databases 204, and database tables 205 for a period of one month. To accomplish this, the registrant 203 may navigate to his hosting provider's control panel website 109 via the browser 200 on his home computer (e.g., client 201). The control panel website 109 may display a button entitled "Lock Website" and a data field, in which the registrant 203 may enter the requested website 107 lock time period of one month. When the "Lock Website" button is clicked by the registrant 203, the website management server 108 hosting the control panel website 109 may transmit, via the Internet, an electronic request to lock the website 107, which subsequently may be received by the hosting server 100 (Step 510).

Responsive to receiving the request to lock, the server 100 may save the original access permission settings (Step 610) for the directories 104, folders 103, files 102, databases 204, and/or database tables 205 that provide the website's 107 functionality and subsequently change them to a read-only status (Step 520), thereby locking the website 107 and reducing the likelihood of hacking. Upon the expiration of the one month time period, the server 100 automatically may restore access permissions to their original settings (Step 620).

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed is:

1. A method, comprising:
   A) hosting a website on at least one server computer communicatively coupled to a network;
   B) receiving, by one or more of said at least one server computer, a request to lock said website; and
   C) responsive to receiving said request to lock:
      changing, by one or more of said at least one server computer, at least one access permission on a filesystem of the at least one server computer to a read-only status for at least one directory, at least one folder, or at least one file rendering said website functional, and
      changing, by one or more of said at least one server computer, at least one access permission to a read-only status for at least one database table rendering said website functional.

2. The method of claim 1, wherein said website resolves from a domain name registered to a registrant.

3. The method of claim 2, wherein said request to lock is received from said registrant.

4. The method of claim 3, wherein said request to lock is received via a control panel website hosted on at least one website management server computer.

5. The method of claim 4, wherein said control panel website is password-protected.

6. The method of claim 4, wherein said control panel website is configured to enable said registrant to control a plurality of settings for said website.

7. The method of claim 6, wherein said plurality of settings comprise a plurality of access permissions for said at least one directory, said at least one folder, or said at least one file.

8. The method of claim 7, wherein said plurality of access permissions are selected from the group consisting of a write permission, a read permission, an execute permission, an update permission, a delete permission, and a drop permission.

9. The method of claim 6, wherein said plurality of settings enable and disable file transfer to said website.

10. The method of claim 9, wherein said plurality of settings enable and disable file transfer to said website via file transfer protocol, file transfer protocol-secure, secure copy protocol, or secure shell network protocol.

11. The method of claim 1, wherein said request to lock further comprises a lock time period.

12. The method of claim 11, further comprising: saving an original setting for said at least one access permission before changing said at least one access permission.

13. The method of claim 12, further comprising:
   restoring said at least one access permission to said original setting when said lock time period expires.

14. A method, comprising:
   A) storing at least one file in at least one folder or at least one directory on at least one web server computer communicatively coupled to a network;
   B) storing at least one database and at least one database table on at least one database server computer communicatively coupled to said network;
   C) hosting a website on one or more of said at least one web server computer communicatively coupled to said network, said website configured to provide functionality by accessing said at least one directory, said at least one folder, said at least one file, said at least one database, or said at least one database table;
   D) receiving, by said at least one web server computer, a request to lock said website; and
   E) responsive to receiving said request to lock:
      changing, by one or more of said at least one web server computer, an access permission on a filesystem of the at least one server computer to a read-only status for said at least one directory, said at least one folder, or said at least one file rendering said website functional, and
      changing, by one or more of said at least one web server computer, an access permission to a read-only status for said at least one database table rendering said website functional.

15. The method of claim 14, wherein said website resolves from a domain name registered to a registrant.

16. The method of claim 15, wherein said request to lock is received from said registrant.

17. The method of claim 16, wherein said request to lock is received via a control panel website hosted on at least one website management server computer.

18. The method of claim 17, wherein said control panel website is password-protected.

19. The method of claim 17, wherein said control panel website is configured to enable said registrant to control a plurality of settings for said website.

20. The method of claim 19, wherein said plurality of settings comprise a plurality of access permissions for said at least one directory, said at least one folder, or said at least one file.

21. The method of claim 20, wherein said plurality of access permissions are selected from the group consisting of a write permission, a read permission, an execute permission, an update permission, a delete permission, and a drop permission.

22. The method of claim 19, wherein said plurality of settings enable and disable file transfer to said website.

23. The method of claim 22, wherein said plurality of settings enable and disable file transfer to said website via file transfer protocol, file transfer protocol-secure, secure copy protocol, or secure shell network protocol.

24. The method of claim 14, wherein said request to lock further comprises a lock time period.

25. The method of claim 24, further comprising: saving an original setting for said at least one access permission before changing said at least one access permission.

26. The method of claim 25, further comprising: restoring said at least one access permission to said original setting when said lock time period expires.

* * * * *